United States Patent Office

3,634,545
Patented Jan. 11, 1972

---

3,634,545
ACRYLONITRILE GRAFT POLYMERS
Helmut Engelhard, Leverkusen, Francis Bentz, Cologne, and Wolfgang Giessler and Gunther-Ernst Nischk, Dormagen, Germany, assignors to Farbenfabriken Bayer Aktiengesellschaft, Leverkusen, Germany
No Drawing. Filed Aug. 14, 1969, Ser. No. 850,224
Claims priority, application Germany, May 16, 1969,
P 19 24 827.2
Int. Cl. C08f *11/02, 29/56;* C08g *39/10;* D06d *3/72*
U.S. Cl. 260—873          12 Claims

ABSTRACT OF THE DISCLOSURE

The present invention relates to acrylonitrile graft polymers containing at least 50% by weight of graft polymerised acrylonitrile and optionally up to 10% by weight of another graft polymerised acrylic, methacrylic, vinyl or vinylidene comonomer and, as graft substrate from 5 to 40% by weight of a linear polyether containing tertiary nitrogen atoms or a derivative thereof which is quaternized on the nitrogen.

---

The invention furthermore relates to a process for the preparation of the acrylonitrile graft polymers in which acrylonitrile, optionally together with up to 10% of other copolymerisable monomers, is grafted by polymerisation on a linear polyether of molecular weight 1,000 to 15,000 which contains tertiary nitrogen atoms or on a derivative thereof which is partly or completely quarternized on the tertiary nitrogen atoms, in the presence of a radical-forming catalyst in an aqueous, nitric acid medium at a temperature of from 0 to 90° C.

The invention relates to acrylonitrile graft polymers which can be dyed satisfactorily with acid dyes, and to a process for their production by grafting acrylonitrile, optionally with other copolymerisable compounds, on linear polyethers which contain tertiary nitrogen atoms or and derivatives of such polyethers which are quaternised on the nitrogen.

The affinity of acrylonitrile homopolymers and copolymers for acid dyes is distinctly improved by inter alia copolymerisation of acrylonitrile with unsaturated amines such as vinyl- or isopropenyl pyridines, monovinyl or monoallyl ethers of amino alcohols, dialkylaminoalkyl acrylates or methacrylates or acrylic or methacrylic acid amides (see Houben-Weyl, vol. 14/1, p. 998 et seq., 1961).

Another method of increasing the dyeability of acrylonitrile polymers consists in grafting the monomer on basic prepolymers. For example, polyvinyl pyridine (see U.S. Pat. No. 2,882,290); polymeric amides of alkenylcarboxylic acids, such as polyacrylic acid amide, or polycitraconic acid amide (see U.S. Pat. No. 2,620,324): poly-N,N-dimethyl-acrylamide or -methacrylamide (see U.S. Pats. Nos. 2,879,253, and 2,879,254); and polymers of N-vinylcarboxylic acid amides (see U.S. Pat. No. 2,735,830) or N-vinyl lactams such as poly-N-vinyl-pyrrolidone (see British patent Specification No. 819,049) have been used as substrates for the grafting reaction.

The present invention relates to acrylonitrile graft polymers containing at least 50% by weight of graft polymerised acrylonitrile and optionally up to 10% by weight of another graft polymerised acrylic, methacrylic, vinyl or vinylidene comonomer and, as graft substrate from 5 to 40% by weight of a linear polyether containing tertiary nitrogen atoms or a derivative thereof which is quaternized on the nitrogen, which polyether has the general formula $$Y_1—D—Y_2$$

wherein D represents
(a) a bivalent radical of the general formula

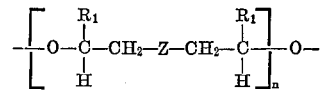

in which $R_1$ represents hydrogen or a $C_1$–$C_3$ alkyl radical and Z represents a bifunctional nitrogen function of the general formula

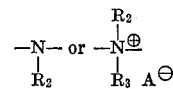

in which $R_2$ represents a $C_1$–$C_6$ alkyl or a cycloalkyl radical, $R_3$ represents a $C_1$–$C_4$ alkyl radical and $A^\ominus$ represents a halide ion or anion of the formula

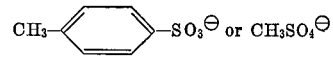

or $R_3$ and $A^\ominus$ together form a group of the formulae $$—(CH_2)_3SO_3^\ominus \text{ or } —(CH_2)_4SO_3^\ominus$$

and $n$ represents a number of about 10 to 80, or
(b) a linear polyether without terminal hydrogen atoms, which has been obtained cocondensation of 90 to 99.5% by weight of diol of the general Formula I

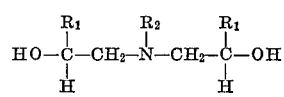

with either from 10 to 0.5% by weight of a second diol of the general Formula II

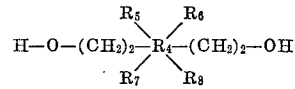

wherein $R_1$ represents hydrogen or a $C_1$–$C_3$ alkyl radical, $R_2$ represents a $C_1$ to $C_6$ alkyl or a cycloalkyl radical, $R_4$ represent one or more aromatic radicals which are connected either directly or via hetero atoms or linear or branched alkylene groups, and $R_5$, $R_6$, $R_7$ and $R_8$ each represents hydrogen or an alkenyl radical with 2 to 6 carbon atoms, at least one of the four substituents being an alkenyl radical, or with 10 to 0.5 percent by weight of an ether-containing aromatic dicarboxylic acid or of a corresponding ester of the Formula III

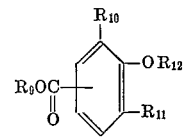

III wherein $R_9$ represents hydrogen or a $C_1$–$C_6$ alkyl radical, $R_{10}$ and $R_{11}$ represent hydrogen or aliphatic linear or branched radicals which have 3 to 6 carbon atoms and contain a double bond, and $R_{10}$ and $R_{11}$ may be the same or different but at least one of the two radiacls must be an unsaturated radical according to the meaning indicated above, $R_{12}$ represents either a carboxyalkyl or carboalkoxyalkyl radical or a radical of the formula

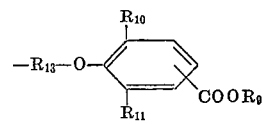

in which $R_9$, $R_{10}$ and $R_{11}$ have the meanings indicated above and $R_{13}$ represents a bivalent radical of the formula

which is linear or branched and in which $m$ has a value from 1 to 12, preferably 2 to 6, or a radical of the formula —Ar—, —Ar—O—Ar, —Ar—SO$_2$—Ar,

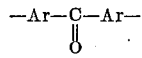

or —Ar—O—Ar—SO$_2$—Ar—O—Ar— in which each Ar represents an optionally substituted bivalent aromatic radical, or $R_{12}$ represents a radical of the formula

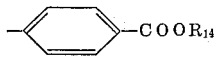

in which $R_{14}$ has the same meaning as $R_9$ and may be the same as $R_9$ or different; in the above formula $Y_1$—D—$Y_2$, hydrogen or a radical of the formula

in which $R_{15}$ represents a $C_2$ to $C_6$ alkenyl radical. In the case of (a), 0–75 mol percent of $(Y_1+Y_2)$ consists of the radical

and in the case of (b), $Y_1$ and $Y_2$ represent hydrogen. The graft substrate has a molecular weight of about 1,000 to 15,000 and the graft polymer has a K-value [Fikentscher, Cellulosechemie 13, 58 (1932)] in the region of 70–110.

The acrylonitrile graft polymers contain, as graft substrate, from 5 to 40% by weight of a linear polyether containing tertiary nitrogen atoms, for example having the formula

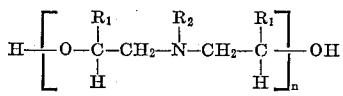

in which $R_1$ represents hydrogen or $C_1$ to $C_3$ alkyl, $R_2$ represents $C_1$ to $C_6$ alkyl or cycloalkyl and $n$ represents a number of from about 10 to 80, the graft substrate having a molecular weight of about 1,000 to 15,000.

The linear polyethers which contain tertiary nitrogen atoms may also be of the type which are obtained by co-condensation of 90 to 99.5% by weight of a diol of the general formula

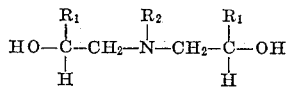

with either 10 to 0.5% by weight of a second diol of the general formula

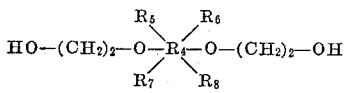

in which $R_1$ represents hydrogen or a $C_1$ to $C_3$ alkyl radical, $R_2$ represents a $C_1$ to $C_6$ alkyl or a cycloalkyl radical, $R_4$ represents one or more aromatic radicals which are connected either directly or via hetero atoms or linear or branched alkylene groups, and $R_5$, $R_6$, $R_7$ and $R_8$ each represents hydrogen or an alkenyl radical having 2 to 6 carbon atoms, at least one of the 4 substituents being an alkenyl radical, or by co-condensation with 10 to 0.5% by weight of an ether containing aromatic dicarboxylic acid or a corresponding ester of the formula

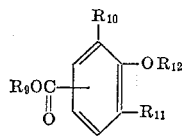

in which $R_9$ represents hydrogen or a $C_1$ to $C_6$ alkyl radical, $R_{10}$ and $R_{11}$ represent hydrogen or aliphatic linear or branched radicals which have 3 to 6 carbon atoms and contain a double bond, and $R_{10}$ and $R_{11}$ may be the same or different but at least one of the two radicals must be an unsaturated radical according to the definition given above, $R_{12}$ represents a carboxyalkyl or carboalkoxyalkyl radical or a radical of the formula

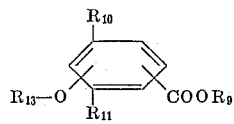

in which $R_9$, $R_{10}$ and $R_{11}$ have the meanings indicated above and $R_{13}$ represents a bivalent radical of the formula

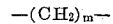

which may be linear or branched and in which $m$ has a value from 1 to 12, preferably 2 to 6, or $R_{13}$ represents a radical of the formula —AR—, —AR—O—AR—, —AR—SO$_2$—AR—,

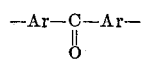

or —AR—OArSO$_2$—AR—O—AR—, in which each Ar represents an optionally substituted bivalent aromatic radical or $R_{12}$ represents a radical of the formula

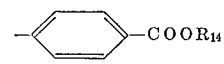

in which $R_{14}$ has the same meaning as $R_9$ and may be the same as or different from $R_9$. The linear polyether which contains tertiary nitrogen atoms has a molecular weight of 1,000 to 15,000.

Further, the graft substrates may also be linear polyethers containing tertiary nitrogen atoms of the general formula

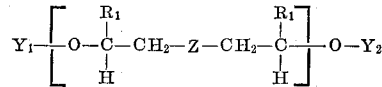

in which $R_1$ represents hydrogen or a $C_1$ to $C_3$ alkyl radical, $Y_1$ and $Y_2$ may be the same or different and represent hydrogen or a radical of the formula

in which $R_{15}$ is a $C_2$–$C_6$ alkenyl radical and 25–75 mol percent of $(Y_1+Y_2)$ is the radical $R_{15}$—CO— and Z is a bifunctional nitrogen function of the general formula

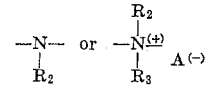

in which $R_2$ represents a $C_1$–$C_6$ alkyl or cycloalkyl radical, $R_3$ represents a $C_1$–$C_4$ alkyl radical and $A^{(-)}$ represents a halide ion or an anion of the formulae

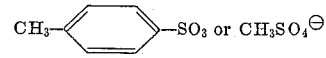

or $R_3$ and $A^{(-)}$ may together form a group of the formula $(CH_2)_3SO_4^{(-)}$ or —$(CH_2)_4SO_4^{(-)}$ and $n$ represents a number of from about 10 to 50. The graft substrate has a molecular weight of about 1,000 to 15,000.

The invention furthermore relates to a process for the preparation of the acrylonitrile graft polymers in which acrylonitrile, optionally together with up to 10% of other copolymerisable monomers, is grafted by polymerisation on a linear polyether of molecular weight 1,000 to 15,000 which contains tertiary nitrogen atoms or on a derivative thereof which is partly or completely quarternized on the tertiary nitrogen atoms, in the presence of a radical-forming catalyst in an aqueous, nitric acid medium at a temperature of from 0 to 90° C.

The preparation of the basic polyethers having molecular weights of from about 1,000 to about 15,000 used as graft substrates is carried out by known methods, e.g. by condensing diols which contain tertiary nitrogen atoms, either alone or together with a small proportion of ordinary glycols, in the presence of acid catalysts (e.g. phosphoric acid, sulphuric acid or a sulphonic acid) at elevated temperatures (e.g. 150 to 280° C.). It is advantageous to use basic polyethers which contain at least 0.7 to 1 tertiary nitrogen atoms per polyether unit. If desired polyethers which have terminal hydroxyl groups may first be lengthened with chain-lengthening agents such as diisocyanates, dicarboxylic acids and their functional derivatives.

Diols of the Formula I

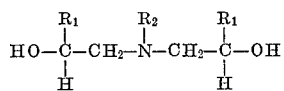
                                       I are N-β-hydroxyalkylamines, such as may be obtained, for example, by the addition of alkylene oxides, such as ethylene oxide, propylene oxide, butylene oxide or styrene oxide, or mixtures of alkylene oxides, to primary amines of the aliphatic series (e.g. methyl, ethyl, butyl, isobutyl, propyl or allylamine) or of the cycloaliphatic series (e.g. cyclohexylamine).

Diols of Formula II $$HO-(CH_2)_2-O-R_4-O-(CH_2)_2-OH$$
$$\text{with } R_5, R_6, R_7, R_8 \quad\quad II$$

are prepared by reacting difunctional phenols or bisphenols with alkenyl halides, such as allyl halides, in suitable solvents such as water or acetone, in the presence of alkali metal carbonates or alkali metal hydroxides to form difunctional dialkenyl ethers [L. Fieser and Campbell, J. Amer. Chem. Soc., 61, 2206 (1939)]. Molecular rearrangement of the se O-alkenyl compounds to the C-alkenyl compounds takes place in the melt at 170 to 300° C. or in diluents such as N-N-dimethylaniline. The resulting substituted phenols are then reacted by known methods with alkene oxides in the presence of catalysts, such as KOH or tetramethylammonium chloride, at temperatures of 100 to 150° C., preferably without solvents.

Unsaturated dicarboxylic acids or esters of Formula III

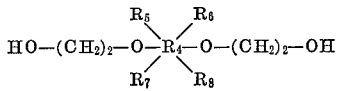
                                     III are prepared according to an earlier proposal of the applicants (patent application P 17 68 938.2) by reacting hydroxybenzoic acids which contain unsaturated radicals, or esters or alkali metal salts thereof with dihalogen compounds or halogenobenzoic acids in polar organic solvents at temperatures of from 50 to 160° C.

The following are examples of unsaturated diols of the type indicated:

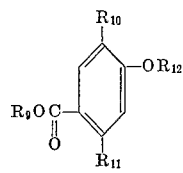

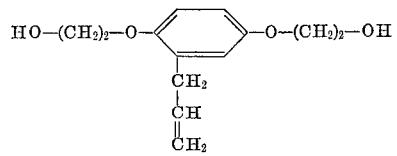

The following are examples of dicarboxylic acids or esters:

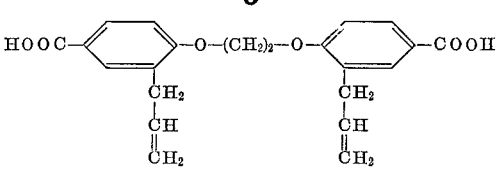

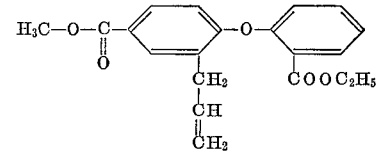

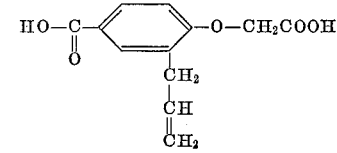

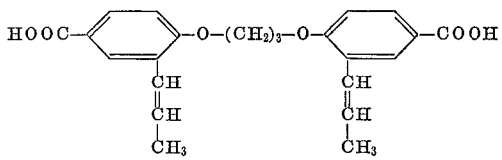

Polyethers of Formula IV

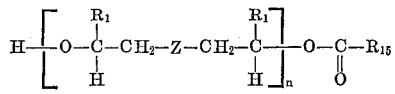
                                       IV are obtained by acylating and optionally quaternising the polyethers.

Acylation of the end groups of the basic condensates is advantageously carried out with acid halides, such as acrylic, methacrylic or crotonic acid chloride, or anhydrides, such as maleic acid anhydride. The reaction is carried out without acid acceptors, and either in inert solvents such as benzene, dioxane, chloroform or methylene chloride, which are then removed by evaporation in vacuo after the reaction, or in the acrylonitrile itself which is to be polymerised, the acrylonitrile serving as solvent for the acylation. The polyether may also be acylated with the acid derivative without solvents. If the polyethers have molecular weights of 1,000 to 4,000, it is preferable not to substitute more than about 50% of the hydroxyl groups in order to prevent cros-linking of the graft polymers, but with polyethers of higher molecular weight acylation of up to about 75% is possible without cross-linking. Acylation of at least about 25% of the hydroxyl groups is advantageous, but it is also possible to acylate smaller amounts.

If quaternised polyethers are to be used as graft substrates, the alkylating agent is either added to the polyether after it has been prepared or, in the case of a polyether which is acylated in the end positions, it is added after the acylating reaction, and the reaction mixture is boiled under reflux. It is advantageous to add alcohol. After evaporation of any solvent present, the reaction product is dissolved in water which has been slightly acidified with nitric acid and is used for the graft polymerisation. Suitable quanternising agents are compounds such as dimethyl sulphate, p-toluenesulphonic acid esters and sultones such as propane sulton or butane sultone.

The graft polymerisation of acrylonitrile on the polyethers is advantageously carried out in the presence of other copolymerisable monomers, for example acrylic or methacrylic acid esters, vinyl acetate, vinyl chloride, vinylidene chloride, acrylamides or methacrylamides. This method has an effect not only on the dyeing properties of the polymers but especially also on their solubility. The amount of graft substrate, based on the total weight of reactants which are to be polymerised, in 5 to 40% by weight and preferably 10 to 20% by weight.

The graft polymerisation is carried out in a weak nitric acid solution, using water-soluble radical-forming catalyst systems such as peroxides, azo compounds or Redox systems based on per oxidic compounds and compounds of sulphur in its lower oxidation states, such as potassium, sodium or ammonium persulphate, sulphur dioxide, alkali metal hydrosulphites alkali metal pyrosulphites or alkali metal thiosulphates. The amount of catalyst used is 0.25 to 5% by weight, based on the total weight of polymerisation reactants.

The ratio of oxidising agent to reducing agent is preferably between 1:0.5 and 1:10. The amount of water is 5 to 15 times and the temperature range of polymerisation is from 20 to 90° C.

Graft polymerisation is carried out by first dissolving the polyether in water which is slightly acidified with nitric acid and then, after introducing the reactants which are to be copolymerised, adjusting the pH to a value from 1 to 6 preferably from 2 to 3 by adding small quantities of nitric acid, sodium carbonate or sodium hydroxide at the polymerisation temperature, and then adding the initiator system either all at once to the monomer mixture in the reaction vessel or continuously, together with a portion of the monomers, to the rest of the reactants. The graft polymers obtained are removed by suction filtration, washed and dried. By this process, they are obtained in high yields and with the K-values of 70 to 100 [according to Fikentscher, Cellulosechemie 13, 58 (1932)] necessary for technical uses.

Films produced from approximately 15% by weight dimethyl formamide solution can be dyed satisfactorily with the acid dye Azilane Direct Blue A (Colour Index, vol. I, page 1264). The polymer dissolved in dimethyl formamide undergoes little discoloration on heat treatment and can be spun.

The dyeability is measured by the following method: To determine the dyeabality, a thin film (250 to 500μ) is produced on a glass plate from an approximately 15 to 20% by weight dimethyl formamide solution of the polymer. This film is then dried at 50 to 60° C. for 5 hours, stripped from the glass plate and then boiled in water for one hour to remove any occluded dimethyl formamide. The film is then boiled for 1½ hours with 100 parts by volume of the dye solution (1 part by weight of Azilane Direct Blue A and 8 parts by volume of 10% by weight sulphuric acid dissolved in 1000 parts by volume of water) and lastly again boiled for one hour with distilled water. The dry coloured film is dissolved in 100 parts by volume of dimethyl formamide and the extinction of this solution is measured at 20° C. at a predetermined wavelength. Extinction per g. of film is used as unit of measurement. Fibres produced from the graft polymers are distinguished by a good natural colour, excellent dyeability and good response to heat treatment. In the examples, the parts by weight are related to parts by volume as kg. to litre.

Comparison values

Dyeability (foils) with Azilane Direct Blue A (578 μm):

$$\frac{\text{Extinction}}{\text{Foil weight}} (g.^{-1})$$

Polyacrylonitrile with 2.2% by weight of 2-vinyl pyridine: 13.7
Polyacrylonitrile with 4.65% by weight of 2-vinyl pyridine: 23.1–23.3

Preparation of the polyethers used in Examples 1 to 4 and 12 to 17

200 parts of N,N-di-(β-hydroxyethyl)-cyclohexylamine and 2 parts of phosphorous acid were condensed under nitrogen on a descending cooler. Condensation was continued at a sump temperature of 200 to 240° C. until the desired degree of condensation was reached. The polyether having the given average molecular weight indicated in each case was obtained as residue.

EXAMPLE 1

7 parts by weight of the basic polyether

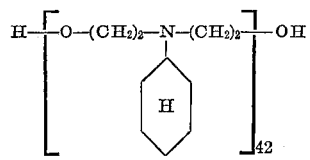

of average molecular weight 7,200 are dissolved by warming in 930 ml. of slightly nitric acid water, 59.5 parts by weight of acrylonitrile and 3.5 parts by weight of methyl acrylate are added and the pH of the reaction mixture is adjusted to 2.3 at 50° C.

Polymerisation is then initiated with 0.3 part by weight of potassium persulphate and 0.3 part by weight of sodium bisulphite in a nitrogen atmosphere with stirring at 50° C. Polymerisation is carried out for 10 hours at 50° C. and the resulting white polymer is removed by suction filtration, washed and dried in vacuum at 50° C.

Yield: 59 parts by weight (84.3% of the theoretical)
K-value: 76 (according to Fikentscher, Cellulosechemie 13, 58 (1932))
Dyeability (Azilane Direct Blue A; 578 mμ):

$$\frac{\text{Extinction}}{\text{Foil weight}} (g.^{-1})\ 23$$

Nitrile content: 88.9%
Ester content: 5.0%
Graft substrate: 6.1%.

The acrylonitrile graft polymer is dissolved in dimethyl formamide (25% by weight solution) and fibres are dry-spun from this spinning solution. The fibres have a satisfactory natural colour and the excellent dyeability indicated above.

EXAMPLE 2

Reaction mixture as in Example 1.
Starter: 0.2 part by weight of potassium persulphate, 0.2 part by weight of sodium metabisulphite
Time: 10 hours at 50° C.
Yield: 64 parts by weight (91.5% of the theory)
K-value: 85
Dyeability (Azilane Direct Blue A; 578 mμ):

$$\frac{\text{Extinction}}{\text{Foil weight}} (g.^{-1})\ 24.5\text{--}25.3$$

Nitrile content: 87.5%
Ester content: 5.1%
Graft substrate: 7.4%

EXAMPLE 3

Example 3 demonstrates the influence of the average molecular weight of the graft substrate on the dyeability, i.e. on the degree of grafting in the reaction.

7 parts by weight of the polyether

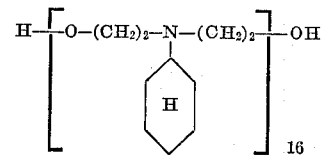

of average molecular weight 2,700 are dissolved as described in Example 1 and the same quantities of comonomers are added. The pH of the reaction solution is 2.5, the initiator comprises 0.3 part by weight of potassium persulphate and 0.3 part by weight of sodium metabisulphite.

Temperature: 50° C., Time—6 hours
Yield: 47 parts by weight (67.1% of the theory)
K-value: 80
Dyeability (Azilane Direct Blue A; 578 mμ)

$$\frac{\text{Extinction}}{\text{Foil weight}} \text{ (g.}^{-1}\text{) } 16.0\text{–}16.7$$

Nitrile content: 90.2%
Ester content: 4.6%
Graft substrate: 5.2%

EXAMPLE 4

10.5 parts by weight of the polyether of Example 3 are dissolved as already described and 56 parts by weight of acrylonitrile and 3.5 parts by weight of methyl acrylate are added.

Polymerisation is initiated at 50° C. with 0.3 part by weight of potassium persulphate and 0.3 part by weight of sodium metabisulphite at a pH of 2.6.

Time: 8 hours, temperature: 50° C.
Yield: 49 parts by weight (70% of the theory)
K-value: 93
Dyeability (Azilane Direct Blue A; 578 mµ):

$$\frac{\text{Extinction}}{\text{Foil weight}} \text{ (g.}^{-1}\text{) } 22.8\text{–}23.2$$

EXAMPLE 5

7 parts by weight of a polyether of 98% by weight of

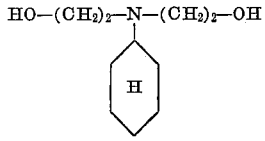

and 2% by weight of

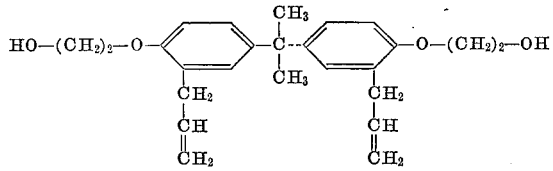

of OH number 13.5 (molecular weight≈8300) are dissolved by warming in 930 parts by volume of aqueous nitric acid and the pH of the solution is adjusted to 2.6 by the addition of soda.

This solution is introduced into a three-necked flask, 59.5 parts by weight of acrylonitrile and 3.5 parts by weight of methyl acrylate are added and polymerisation is initiated with 0.3 part by weight of potassium persulphate and 0.3 part by weight of sodium bisulphite at 55° C. under nitrogen and with stirring. After reaction for 8 hours at 55° C., the white polymer is removed by suction filtration, washed free from acid and dried in vacuum at 50–60° C.

Yield: 56 g. (80% of the theory)
K-value: 97.

Analysis of the graft polymer reveals the following composition:

Nitrile content: 86.9%
Ester content: 4.9%
Graft substrate: 8.2%
Dyeability (Azilane Direct Blue, 578 mµ):

$$32.8 \frac{\text{Extinction}}{\text{Foil weight}} \text{ (g.}^{-1}\text{)}$$

Comparison: Polyacrylonitrile with 4.6% of 2-vinylpyridine—

$$23.3 \frac{\text{Extinction}}{\text{Foil weight}} \text{ (g.}^{-1}\text{)}$$

Heat treatment 1 g. of the polymer was dissolved in 20 parts by volume of dimethyl formamide and compared with equivalent solutions of an acid-modified and of a base-modified polyacrylonitrile at 80 to 90° C. for 14 hours.

All three polymer solutions have the same colour.

The acrylonitrile graft polymer obtained is spun to fibres as in Example 1. These fibres have a good natural colour and excellent dyeability (see above).

The basic polyether used as graft substrate was prepared as follows (see DBP 1,243,874): A mixture of 588 parts by weight of bis-(β-hydroxyethyl)-cyclohexylamine, 12 parts by weight of 2,2-bis-(4,-β-hydroxyethoxy-3-allyl-phenyl)-propane and 3 parts by weight of phosphorous is condensed with stirring in a three-necked flask with descending cooler and under pure nitrogen, first for 3 hours at 200° C., then for 8 hours at 225° C. and lastly under vacuum (12 mm., 225° C.) for 4 hours. The OH number of the residual polyether is 13 to 14. To neutralise the phosphorous acid, the polyether is then stirred with an equivalent quantity of anhydrous soda for 4 hours at 120 to 130° C. The product is then filtered off hot with suction under nitrogen.

EXAMPLE 6

7 parts by weight of a polyether of 99.5% by weight of

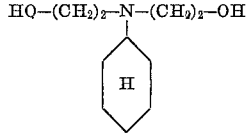

and 0.5% by weight of

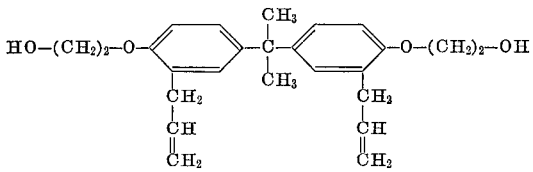

of OH number 9.1 (molecular weight≈12,200) are dissolved as described in Example 5, treated with comonomers and polymerised.

Yield: 53 g. (75.6% of the theoretical)
K-value: 92
Dyeability (Azilane Direct Blue A, 578 mµ):

$$27.8 \frac{\text{Extinction}}{\text{Foil weight}} \text{ (g.}^{-1}\text{)}$$

The basic polyether used was prepared as follows: 498 parts by weight of bis-(β-hydroxyethyl)-cyclohexylamine, 2.5 parts by weight of 2,2-bis-(β-hydroxyethoxy-3-allylphenyl)-propane and 2.5 parts by weight of phosphorous acid are condensed up to an OH number of 9 to 9.5 as indicated in Example 5 and reacted with soda.

EXAMPLE 7

10.5 parts by weight of a polyether of 98% by weight of

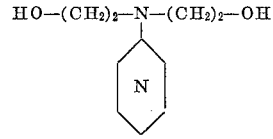

and 2% by weight of

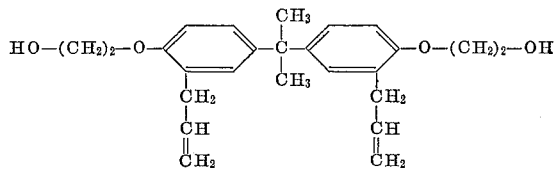

which had been condensed to OH number 5.7 (molecular weight 19,700) as described in Example 5 are dissolved in 930 parts by volume of aqueous nitric acid and treated with 56 parts by weight of acrylonitrile and 3.5 parts by weight of methyl acrylate. Polymerisation is initiated with 0.4 part by weight of potassium persulphate and 0.4 part by weight of sodium bisulphite at a pH of 2.6 to 2.7 and a temperature of 55° C. and is stopped after 6 to 7 hours.

Yield: 56 parts by weight (80% of the theoretical)
K-value: 86
Dyeability (Azilane Direct Blue A, 578 mµ):

$$37.5 \text{ to } 38.0 \frac{\text{Extinction}}{\text{Foil weight}} \text{ (g.}^{-1}\text{)}$$

EXAMPLES 8 AND 9

Preparation of the polyether of bis-β-hydroxyethyl-cyclohexylamine (1) and bis-(2-allyl-4-carboxy-phenoxy)-ethane-(1,2) (2)

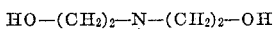
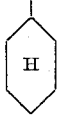
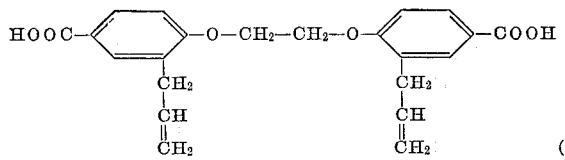

196 parts by weight of (1) and 4 parts by weight of (2) are first precondensed (3 to 4 hours) under nitrogen at 200° C. 2 parts by weight of phosphorous acid are then added and the reaction mixture is heated for 9 hours at 220 to 230° C. under normal pressure and for 2 hours at 220 to 230° C. and 12 mm. Hg. OH number: 5.2 (molecular weight≈21,500).

After treatment with soda as already described above, the syrupy polyether is added.

17.5 parts by weight of this polyether are dissolved with warming in 1000 parts by volume of aqueous nitric acid and the pH is adjusted to 2.5.

EXAMPLE 8

400 parts by volume of this solution (corresponding to 10% by weight of graft substrate) are made up to 930 parts by volume with water, and 59.5 parts by weight of acrylonitrile and 3.5 parts by weight of methyl acrylate are added. Polymerisation is initiated with 0.3 part by weight of potassium persulphate and 0.3 part by weight of sodium bisulphite at 50° C. and at a pH of 2.8. The reaction time is 7 hours at 50 to 55° C. The product is removed by suction filtration, washed with warm water until neutral and dried at 50° C. in vacuo.

Yield: 50 g. (71.5% of the theoretical)
K-value: 96
Dyeability (Azilane Direct Blue A, 578µ):

$$38 \frac{\text{Extinction}}{\text{Foil weight}} \text{ (g.}^{-1}\text{)}$$

Amount of graft substrate present (titration with perchloric acid, determination of the tertiary nitrogen content):

Initial polyether: 5.9 val./kg.
Polymer: 0.43 val./kg.
0.46 val./kg.=7.63% of graft substrate

EXAMPLE 9

600 parts by volume of the above solution (=15% by weight of graft substrate provided) are again made up to 930 parts by volume, 56 parts by weight of acrylonitrile and 3.5 parts by weight of methyl acrylate are added, and graft polymerisation is started at pH=2.6 and 50° C. by the addition of 0.4 part by weight of potassium persulphate and 0.4 part by weight of sodium bisulphite. The product is worked up after 7 hours at 52 to 55° C.

Yield: 57 g. (81% of the theory)
K-value: 93
Dyeability (Azilane Direct Blue A, 578 mµ):

$$46 \frac{\text{Extinction}}{\text{Foil weight}} \text{ (g.}^{-1}\text{)}$$

Amount of graft substrate present (titration with perchloric acid to determine the tertiary nitrogen content)—

Polyether originally provided: 5.9 val./kg.
Polymer: 0.83 val./kg.=14.1% of graft substrate

EXAMPLE 10

Grafting on a polyether of the following formula:

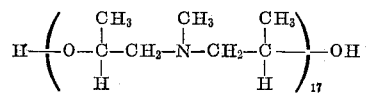

Preparation of the polyether: 200 parts by weight of bis-β-hydroxypropyl-methylamine are condensed for 25 hours at 200 to 220° C. under nitrogen after the addition of 3 parts by weight of phosphorous acid. The volatile constituents are then removed in vacuum at 15 mm. OH number=52–53, Molecular weight≈2270.

10.5 parts by weight of this polyether are dissolved in 930 parts by volume of aqueous acetic acid and treated with 56 parts by weight of acrylonitrile and 3.5 parts by weight of methyl acrylate. Polymerisation is initiated with 0.3 part by weight of potassium persulphate and 0.3 part by weight of sodium bisulphite at 50° C. and a pH of 2.6. The reaction time was 7 hours at 50 to 55° C. After suction filtration, washing and drying at 50° C. in vacuum, the yield is 50 g. (71.5% of the theoretical), K-value 86, dyeability (Azilane Direct Blue A; 578 mµ):

$$18.1 \frac{\text{Extinction}}{\text{Foil weight}} \text{ (g.}^{-1}\text{)}$$

Amount of graft substrate present (by determining the tertiary nitrogen content)—

Initial polyether=7.3 val./kg.
Graft polymer=0.38 val./kg.=5.2% of graft substrate.

EXAMPLE 11

Grafting of a polyether of the following formula:

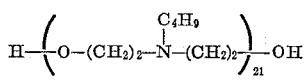

The polyether is prepared from 500 parts by weight of bis-β-hydroxyethylbutylamine and 7.5 parts by weight of phosphorous acid by heating for 24 hours at 200 to 220° C. followed by removal of the volatile constituents by evaporation at 12 mm. Hg and 200° C.

OH number=37
Molecular weight≈3000

Graft polymerisation is carried out with this polyether as in Example 10.

Yield=52 g. (74.3%)
K-value=80
Dyeability (Azilane Direct Blue A; 578 mµ):

$$20.5 \frac{\text{Extinction}}{\text{Foil weight}} \text{ (g.}^{-1}\text{)}$$

Amount of graft substrate present (tertiary N-content)—
Initial polyether=6.9 val./kg.
Polymer=0.43 val./kg.=6% of graft substrate

EXAMPLES 12 AND 13

21 parts by weight of a polyether of the formula

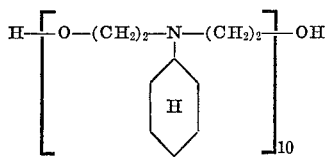

of OH number 58 and a molecular weight of 1,700 which corresponds to an OH content of 2% are dissolved in 500 parts by volume of benzene at room temperature; 1.3 parts by weight of methacryloyl chloride in 10 parts by volume of benzene are added and the reaction mixture is stirred at room temperature for one hour (the quantity of methacryloyl chloride is calculated on a 50% conversion of the hydroxyl groups).

After removal of benzene by evaporation in vacuo, 1 part by weight of soda is added to the residue and the substance is dissolved in aqueous nitric acid. The solution is then divided into two halves and each half is made up to 930 parts by volume with water.

EXAMPLE 12

56 parts by weight of acrylonitrile and 3.5 parts by weight of methyl acrylate are added to one half and the pH is adjusted to 2.7 at 55° C. and polymerisation is initiated with 0.3 part by weight of potassium persulphate and 0.3 part by weight of sodium bisulphite. After a polymerisation time of 7 hours, the polymer is removed by suction filtration, thoroughly washed, and dried in vacuum at 50° C.

Yield: 52 parts by weight (74.5%)
K-value: 86
Dyeability (Azilane Direct Blue A, 578 m$\mu$):

$$50-55 \frac{\text{Extinction}}{\text{Foil weight}} \text{ (g.}^{-1}\text{)}$$

Amount of graft substrate present (determination of the tertiary N-content)
Starting polyether: 5.49 mequ./g.
Graft polymer: 350.355 mequ./kg.=6.4% of graft substrate.

EXAMPLE 13

The same parts by weight of acrylonitrile and methyl acrylate are added to the other half and polymerisation is carried out at 55° C. and pH=2.7 with 0.2 part by weight of potassium persulphate and 0.2 part by weight of sodium bisulphite for 7 hours.

Yield: 49 parts by weight (70%)
K-value: 98
Dyeability (Azilane Direct Blue A, 578 m$\mu$):

$$60-62 \frac{\text{Extinction}}{\text{Foil weight}} \text{ (g.}^{-1}\text{)}$$

Amount of graft substrate built in: 4,100,420 mequ./kg. of tertiary N, corresponding to 7.65% of graft substrate.

EXAMPLES 14 and 15

The examples serve to illustrate the influence of esterification of the polyether with unsaturated acid chlorides on the rate of incorporation in the graft substrate as compared with Examples 12 and 13. 21 parts by weight of the polyether of Examples 12 and 13 of the formula

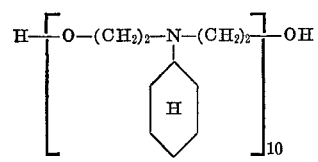

in the non-esterified form, i.e. containing only free OH groups, and 1 part by weight of soda were dissolved in aqueous nitric acid and the solution was then divided into two halves and each half was made up to 930 parts by volume with water. Again 56 parts by weight of acrylonitrile and 3.5 parts by weight of methyl acrylate were added to each half.

EXAMPLE 14

(1st half of the polyether solution)

Temperature: 55° C., pH: 2.7
Initiators: 0.3 part by weight of potassium persulphate and 0.3 part by weight of sodium bisulphite
Polymerisation time: 7 hours
Yield: 53 g. (76%)
K-value: 84
Dyeability (Azilane Direct Blue A; 578 m$\mu$):

$$17 \frac{\text{Extinction}}{\text{Foil weight}} \text{ (g.}^{-1}\text{)}$$

Amount of graft substrate present (determination of tertiary N): 1,150,117 mequ./kg. corresponding to 2.1% of incorporated graft substrate.

EXAMPLE 15

(2nd half of the polyether solution)

Temperature: 55° C., pH 2.7
Initiators: 0.2 part by weight of potassium persulphate and 0.2 part by weight of sodium bisulphite
Reaction time: 7 hours
Yield: 52 parts by weight (74.3%)
K-value: 91
Dyeability (Azilane Direct Blue A; 578 m$\mu$):

$$14.0 \frac{\text{Extinction}}{\text{Foil weight}} \text{ (g.}^{-1}\text{)}$$

Amount of graft substrate present: 105–110 mequ./kg. of tertiary N, corresponding to 1.97% of incorporated graft substrate.

EXAMPLE 16

Example 16 describes the grafting of a quaternised, unilaterally acylated polyether

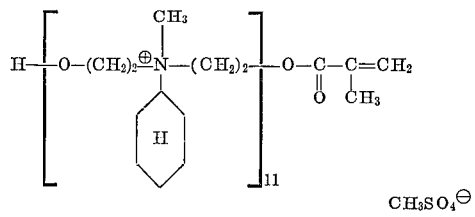

7 parts by weight of a polyether of the formula

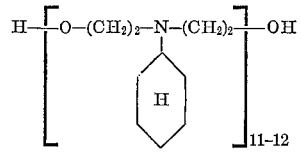

of OH number 57.5, and molecular weight 1950, which corresponds to an OH content of 1.75%, are heated to 50° C. and 0.502 part by volume of methacryloyl chloride are added. The reaction mixture is stirred for 30 minutes at 50° C. and the syrup is then covered with 25 parts by volume of methanol. After the introduction of 3.9 parts by volume of dimethyl sulphate, the reaction mixture is boiled under reflux for 30 minutes and the solvent is evaporated off under vacuum.

1 part by volume of soda is added to the reaction product which is then dissolved with aqueous nitric acid and made up to 930 parts by volume with water. The comonomers added are 59.5 parts by weight of acrylonitrile and 3.5 parts by weight of methyl acrylate and polymerisation is initiated with 0.3 part by weight of potassium persulphate and 0.3 part by weight of sodium bisulphite at 55° C. and pH=3.5. After 6 hours, the product is removed by suction filtration, thoroughly washed and dried.

Yield: 53 parts by weight (71.5%)
K-value: 80
Dyeability (Azilane Direct Blue A, 578 mμ):

$$29\text{-}30 \frac{\text{Extinction}}{\text{Foil weight}} (\text{g.}^{-1})$$

Preparation of the polyether which contains tertiary N-atoms is carried out by a method analogous to that described in Examples 12 and 13.

EXAMPLE 17

75% of the hydroxyl functions of the polyether are in this case acylated. 7 parts by weight of a polyether of the formula

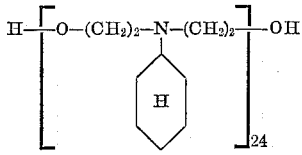

of molecular weight 4000, which corresponds to an OH content of 0.85%, are dissolved in 20 parts by volume of benzene and boiled under reflux for 30 minutes with 0.26 part by volume of methacryloyl chloride. The reaction mixture is concentrated to a syrup by evaporation under vacuum and this syrup is dissolved in 930 parts by volume of a mixture of nitric acid and water. After the addition of 59.5 parts by weight of acrylonitrile and 3.5 parts by weight of methyl acrylate, polymerisation is started at 55° C. and pH=3.5 by the introduction of 0.2 part by weight of potassium persulphate and 0.2 part by weight of sodium bisulphite. The reaction takes 6 hours. The polymer is removed by suction filtration, washed and dried.

Yield: 49 parts by weight (70%)
K-value: 87
Dyeability (Azilane Direct Blue A: 578 mμ):

$$33\text{-}34 \frac{\text{Extinction}}{\text{Foil weight}} (\text{g.}^{-1})$$

Preparation of the polyether which contains tertiary N-atoms is carried out by a method analogous to that described in Examples 12 and 13.

We claim:
1. A graft copolymer having a K-value of 70 to 110, as defined in Fikentscher Cellulosechemie 13, 58 (1932), comprising at least 50% by weight of graft polymerized acrylonitrile and 0 to 10% by weight of another graft polymerized acrylic, methacrylic, vinyl or vinylidene comonomer; and as graft substrate, from 5 to 40% by weight of a linear polyether containing tertiary nitrogen atoms or a derivative thereof which is quaternized on the nitrogen, which polyether has a molecular weight of 1,000 to 15,000 and has the formula

$$Y_1\text{—}D\text{—}Y_2$$

in which D is
(a) a bivalent radical of the formula

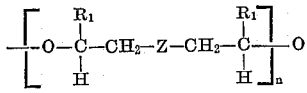

$R_1$ is hydrogen or a $C_1\text{–}C_3$ alkyl radical;
Z is a bifunctional radical of the formula

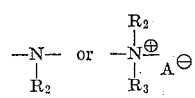

$R_2$ is a $C_1\text{–}C_6$ alkyl or a cycloalkyl radical;
$R_3$ is a $C_1\text{–}C_4$ alkyl radical;
$A^\ominus$ is a halide ion or anion of the formula

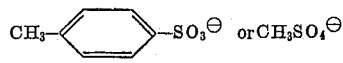

$R_3$ and $A^\ominus$ together form a group of the formula $$-(CH_2)_3-SO_3^\ominus \text{ or } -(CH_2)_4-SO_3^\ominus$$

and $n$ is a number of about 10 to 80; or
(b) a linear polyether without the terminal hydrogen atoms obtained by cocondensation of 90 to 99.5% by weight of a diol of the formula

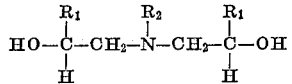     I with 10 to 0.5% by weight of a second diol of the formula

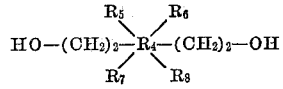     II in which
$R_1$ is hydrogen or a $C_1$ to $C_3$ alkyl radical;
$R_2$ is defined above;
$R_4$ is one or more aromatic radicals which are attached directly or via hetero atoms, or linear or branched alkylene groups;
$R_5$, $R_6$, $R_7$ and $R_8$ each is hydrogen or an alkenyl radical having 2 to 6 carbon atoms, at least one of the four substituents being an alkenyl radical;
wherein in (a) $Y_1$ and $Y_2$ are the same or different and are hydrogen or

0 to 75 mol percent of $(Y_1+Y_2)$ being

wherein $R_{15}$ is $C_2$ to $C_6$ alkenyl; and in (b) $Y_1$ and $Y_2$ are hydrogen.
2. The graft copolymer of claim 1 wherein the polyether has the formula

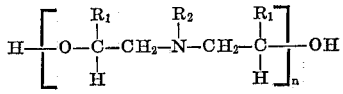

in which $R_1$ is hydrogen or $C_1$ to $C_3$ alkyl; $R_2$ is $C_1$ to $C_6$ alkyl or cycloalkyl; and $n$ is a number from about 10 to about 80.
3. The graft copolymer of claim 1 wherein the polyether is obtained by cocondensation of 90 to 99.5% by weight of a diol of the formula

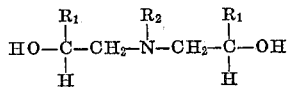

and 10 to 0.5% by weight of a second diol of the formula

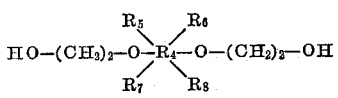

wherein $R_1$, $R_2$, $R_4$, $R_5$, $R_6$, $R_7$ and $R_8$ are defined as in claim 1.
4. The graft copolymer of claim 1 wherein the polyether has the formula

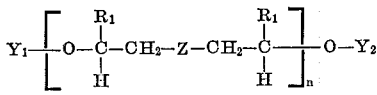

wherein $n$ is a number from about 10 to 50; 25 to 75 mol percent of $(Y_1+Y_2)$ is the radical

and $R_1$, $R_{15}$, $Y_1$ and $Y_2$ are as defined in claim 12.

5. The graft copolymer of claim 4 wherein $R_{15}$ is a radical of the formula

6. The graft copolymer of claim 1 wherein methyl acrylate is the additional comonomer incorporated.

7. A graft copolymer having a K-value of 70 to 110, as defined in Fikentscher Cellulosechemie 13, 58 (1932), comprising at least 50% by weight of graft polymerized acrylonitrile and 0 to 10% by weight of another graft polymerized acrylic, methacrylic, vinyl or vinylidene comonomer; and as graft substrate, from 5 to 40% by weight of a linear polyether containing tertiary nitrogen atoms or a derivative thereof which is quaternized on the nitrogen which polyether having a molecular weight of 1,000 to 15,000 and obtained by cocondensation of 90 to 99.5% by weight of a diol of the formula

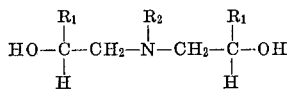

I in which $R_1$ is hydrogen or a $C_1$ to $C_3$ alkyl radical;

$R_2$ is a $C_1$ to $C_6$ alkyl or a cycloalkyl radical; with 10 to 0.5% by weight of an aromatic dicarboxylic acid which contains ether groups or of a corresponding ester of the formula

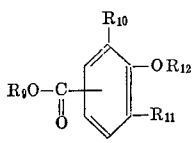

III in which $R_9$ is hydrogen or a $C_1$–$C_6$ alkyl radical;

$R_{10}$ and $R_{11}$ are the same or different and are hydrogen or aliphatic linear or branched radicals which contain a double bond and which have 3 to 6 carbon atoms, providing that at least one of the $R_{10}$ and $R_{11}$ radicals is an unsaturated radical;

$R_{12}$ is a carboxyalkyl, or a carboalkoxyalkyl radical or a radical of the formula

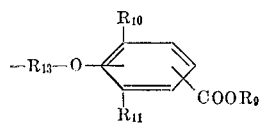

IV $R_{13}$ is

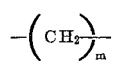

in which $m$ is 1 to 12, or a radical of the formula
—Ar—, —AR—O—AR—, —Ar—SO$_2$—Ar—,

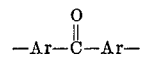

or —Ar—O—Ar—SO$_2$—Ar—O—Ar— in which Ar is an unsubstituted or substituted bivalent aromatic radical; or $R_{12}$ is a radical of the formula

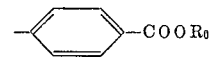

8. A process for the production of acrylonitrile graft polymers containing at least 50% by weight of acrylonitrile in the polymer by graft polymerisation of acrylonitrile on a graft substrate, which comprises polymerizing acrylonitrile, with 0 to 10% of other mono-olefinic copolymerisable monomers, on a linear polyether which contains tertiary nitrogen atoms or a derivative thereof which is quatermised on the nitrogen, which polyether or derivative has a molecular weight of 1,000 to 15,000, said polymerizing being effected in the presence of a radical-forming catalyst in aqueous, dilute nitric acid solution at a pH value of 1 to 6 at a temperature of 0 to 90° C.

9. A process according to claim 8 wherein the additional copolymerisable monomer is methyl acrylate.

10. A process according to claim 8, wherein the radical-forming catalyst is a Redox system consisting of potassium persulphate and sodium metabisulphite.

11. A process according to claim 8, wherein the proportion of graft substrate to the other polymerisable monomers is 30:70 to 5:95.

12. Fibres of acrylonitrile graft polymers according to claim 1.

References Cited

UNITED STATES PATENTS

| | | | |
|---|---|---|---|
| 2,744,086 | 5/1956 | Mowry et al. | 260—873 |
| 3,413,378 | 11/1968 | Magat et al. | 260—873 |
| 3,529,040 | 9/1970 | Rinkler et al. | 260—898 |

WILLIAM H. SHORT, Primary Examiner

E. WOODBERRY, Assistant Examiner

U.S. Cl. X.R.

8—168, DIG. 18; 260—881, 898